United States Patent Office 3,472,814
Patented Oct. 14, 1969

3,472,814
STABLE POLYPHENYLENE ETHER
COMPOSITION
Klaus E. Holoch, Pittsfield, Mass., assignor to General
Electric Company, a corporation of New York
No Drawing. Filed Jan. 18, 1967, Ser. No. 610,007
Int. Cl. C08g 23/16, 51/60, 51/62
U.S. Cl. 260—45.75                  6 Claims

ABSTRACT OF THE DISCLOSURE

A stabilized polyphenylene ether composition consisting of a major portion of a polyphenylene ether and a minor portion of a stabilizer consisting of a hexaalkylphosphoric triamide, boron oxide and a cobalt salt of naphthenic acid.

---

This invention relates to polyphenylene ether plastics, and more particularly, to the stabilization of such plastics with a stabilizer consisting of a hexaalkylphosphoric triamide, boron oxide and a cobalt salt of naphthenic acid.

It is known that the polyphenylene ethers, and particularly the 2,6-dialkyl substituted polyphenylene ethers, are somewhat unstable under the influence of heat and light exposure, causing the resin to become dark colored, brittle and undesirable for many uses. The cause of the degradation is not fully understood, but is believed to be due, in part, to the presence of hydroxyl groups on the polymer chain, a sensitivity to oxygen containing atmospheres, and the degradative effects of traces of impurities present in the resin composition.

The term "polyphenylene ether" includes those polymers disclosed and claimed in U.S. Patents of Allan S. Hays Nos. 3,306,874 and 3,306,875, the polymers disclosed and claimed in U.S. Patents Nos. 3,257,357 and 3,257,358 of Gelu Stoeff Stamatoff (all incorporated by reference) and the various copolymers and blends of the polyphenylene ethers formed by copolymerizing or blending the polyphenylene ethers with other monomers or polymers such as the polyolefins, polystyrenes, polycarbonates, and the like, wherein the polyphenylene ether is present in an amount sufficient to effect the properties of the polymer composition due to the influence of heat and light.

Heretofore, a large number of different compounds such as the phenolic antioxidants exemplified by p-phenylphenol, N-steroyl-p-aminophenol, and 2,2'-methylene-bis (4-ethyl-6-tert.butylphenol) have been used as heat and light stabilizers for the polyphenylene ethers. These stabilizers were generally unsatisfactory for even short exposures to heat. Other stabilizers such as the ketenes, benzoic anhydride and the mercaptobenzimidazoles have also been tried and found to be effective for short periods of exposure to heat, but not for the relatively long exposures required for many commercial uses.

In copending U.S. patent application, Ser. No. 610,134 it is disclosed that the addition of a small amount of a hexaalkylphosphoric triamide is a very effective stabilizer for the polyphenylene ethers when added in amounts varying between 0.01 and about 10% by weight, calculated on the polymer. The hexaalkylphosphoric triamides may be represented by the general formula:

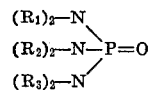

wherein $R_1$, $R_2$ and $R_3$ represent alkyl groups of from 1–6 carbon atoms.

It has now been found that a stabilizing combination of a hexaalkylphosphoric triamide, boron oxide and a cobalt salt of naphthenic acid results in a polymer having a much greater stability to heat and light as exemplified by a time to embrittlement increase of at least 150% as compared to polyphenylene ether containing only hexaalkylphosphoric triamide.

Naphthenic acid is a mixture of acids obtained from petroleum by extraction with an alkali. The acid contains countless components and only a few of these components have been isolated and identified as carboxylic acid derivatives of polyalkyl-substituted cyclopentanes or cyclohexanes. Naphthenic acid is readily converted into water insoluble salts of lead, cobalt and copper. The term "cobalt salt of naphthenic acid," as used throughout this specification is intended to mean the cobalt salts of those materials recovered from petroleum and available commercially under the name "naphthenic acid." Naphthenic acid is discussed more fully in Feiser and Feiser, Introduction to Organic Chemistry, P. C. Heath and Company, Boston, Mass. 1957.

The amount of stabilizer added depends upon its activity, the quality of the polymer to be stabilized, and the conditions to which the polymer is to be exposed. The stabilizer may be added in an amount between about 0.1 and about 10% by weight, calculated on the polymer, and preferably in an amount of between 1.0 and 6% by weight, calculated on the polymer.

In general, the hexaalkylphosphoric triamide should be used in an amount equivalent to the combination of the boron oxide and the cobalt salt of the naphthenic acid, and preferably, should be used in an amount at least equal to twice the amount of the other components in the stabilizer combination. In a preferred embodiment, the hexaalkylphosphoric triamide comprises from 1–3% by weight of the stabilizer composition, the boron oxide comprises from 0.5 to 1.5% of the stabilizer composition, and the cobalt salt of the naphthenic acid comprises from 0.1 to 0.5% of the stabilizer composition.

The manner of adding the stabilizer to the polyphenylene ether is not critical to this invention. Hence, any method can be employed. For example, the stabilizer can be blended with resin powder in a blender, such as a Waring Blendor. Alternatively, the resin can be dissolved in a suitable solvent and the stabilizer added to the solution. The stabilized polymer may then be recovered from solution.

The stabilized compositions of this invention are useful for all purposes for which the polyphenylene ethers have hitherto been used, for example, for conversion to films, fibers, molded articles and the like, by conventional methods.

The following example serves to illustrate the invention, but is not intended to limit it thereto, the parts being by weight unless otherwise stated.

A poly-(2,6-dimethyl-1,4-phenylene) ether, in powder form, and an appropriate stabilizer were blended together in a Waring Blendor for 1–2 minutes. The mixture was then fed to an extruder and extruded at a temperature of about 550° F. The extruded strands were chopped into pellets. Two gram samples of the extruded pellets were molded into film samples by preheating the pellets for one minute at 550° F. and thereafter molding the pellets at a pressure of 20,000 p.s.i. and a temperature of 550° F. for one minute. Films so prepared had a thickness of 10 mils. They were cut into strips measuring 4 by 0.5 inches, and placed in an air circulating oven maintained at 175° C. The effect of the stabilizer was determined by measuring the time to embrittle for each sample. This was determined for each film sample by folding the film at various times during the heat aging process until the film embrittles to a point where it snaps when partially folded. This time is defined as the time to embrittle.

The stabilizer composition, and the time to embrittle is set forth in Table 1 below.

TABLE 1

| Stabilizer composition | Time to embrittle (hrs.) |
|---|---|
| Control (no additive) | 30 |
| 2.0% hexamethylphosphoric triamide | 80 |
| 2.0% hexamethylphosphoric triamide, 1.0% $B_2O_3$ | 160 |
| 2.0% hexamethylphosphoric triamide, 1.0% $B_2O_3$, 0.1% cobalt naphthenate | 250 |

It should be obvious that the invention is susceptible to further modification within the scope of the appended claims.

What I claim as new and desire to secure by Letters Patent of the United States is:

1. A stabilized polyphenylene ether composition consisting of a major portion of a polyphenylene ether and a stabilizing amount of a stabilizer consisting of
    (1) a hexaalkylphosphoric triamide of the formula

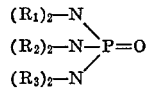

wherein $R_1$, $R_2$ and $R_3$ represent alkyl groups having from 1-6 carbon atoms;
    (2) $B_2O_3$; and
    (3) a cobalt salt of naphthenic acid;
said hexaalkylphosphoric triamide being present in an amount at least equal to the combined amount of the $B_2O_3$ and the cobalt salt of the naphthenic acid.

2. The stabilized polyphenylene ether composition of claim 1 wherein the polyphenylene ether is a poly-(2,6-dimethyl-1,4-phenylene) ether.

3. The stabilized polyphenylene ether composition of claim 1 wherein the stabilizer constitutes from 1-10% by weight of the polymer composition.

4. The stabilized polyphenylene ether composition of claim 1 wherein the stabilizer constitutes from 1-6% by weight of the polymer composition.

5. The stabilized polyphenylene ether of claim 1 wherein the stabilizer comprises from 1-3% hexamethylphosphoric triamide, 1-2% $B_2O_3$ and 0.1 to 0.5% cobalt naphthenate, all calculated on the polymer.

6. A stabilizer composition consisting essentially of
    (1) a hexaalkylphosphoric triamide of the formula

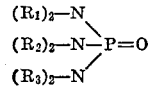

wherein $R_1$, $R_2$ and $R_3$ represent alkyl groups having from 1-6 carbon atoms;
    (2) $B_2O_3$; and
    (3) a cobalt salt of naphthenic acid;
said hexaalkylphosphoric triamide being present in an amount at least equal to the combined amount of the $B_2O_3$ and the cobalt salt of the naphthenic acid.

References Cited

UNITED STATES PATENTS

| 3,100,197 | 8/1963 | Heuck et al. | 260—45.9 |
| 3,082,192 | 3/1963 | Kirshenbaum et al. | 260—45.7 |
| 3,244,662 | 4/1966 | Strauss et al. | 260—45.7 |

HOSEA E. TAYLOR, JR., Primary Examiner

U.S. Cl. X.R.

252—400, 401; 260—45.7, 45.9, 45.95, 47